United States Patent

[11] 3,597,568

| [72] | Inventor | Hans Rach<br>Buttgen near Neuss, Germany |
|---|---|---|
| [21] | Appl. No. | 714,568 |
| [22] | Filed | Mar. 20, 1968 |
| [45] | Patented | Aug. 3, 1971 |
| [73] | Assignee | Bau-Stahlgewebe GmbH<br>Dusseldorf-Oberkassel, Germany |
| [32] | Priority | Mar. 27, 1967 |
| [33] | | Germany |
| [31] | | B 91 749 |

[54] REINFORCING STEEL MATS
7 Claims, 7 Drawing Figs.

[52] U.S. Cl. .................................................. 219/56,
219/56
[51] Int. Cl. .................................................. B23k 11/02
[50] Field of Search .................................................. 219/56, 57, 58

[56] References Cited
UNITED STATES PATENTS

| 3,405,743 | 10/1968 | Robinson | 219/56 |
|---|---|---|---|
| FOREIGN PATENTS | | | |
| 930,877 | 7/1963 | Great Britain | 219/56 |

Primary Examiner—J. V. Truhe
Assistant Examiner—Hugh D. Jaeger

ABSTRACT: In the fabrication of concrete reinforcing steel mats, comprised of spaced parallel longitudinal bars intersected by spaced parallel crossbars, by means of an array of spot-welding electrodes, with a single crossbar being simultaneously welded by said electrodes to the prealigned longitudinal bars and with the partially welded mat structure being advanced, by distances equal to the crossbar spacing distance, by intermittent feeding means operative upon a crossbar in the position of and upon welding, means are provided to withdraw certain of the longitudinal bars from the welding and feeding process during a predetermined initial stage of the welding cycle of a complete mat structure, to result in a final mat with the number of longitudinal bars across the width of the mat varying for different longitudinal sections of said mat, to adapt the mats to varying load distribution in the final concrete structure and to thereby reduce the metal consumption to a minimum. The object is achieved essentially by initially aligning the leading ends of all the horizontal bars ahead of the welding electrodes, as viewed in the feeding direction, and temporarily withdrawing certain of the longitudinal bars from the welding position by means of a displaceably mounted clamping beam carrying spaced releasable discrete clamping devices for selectively securing any of said bars to said beam.

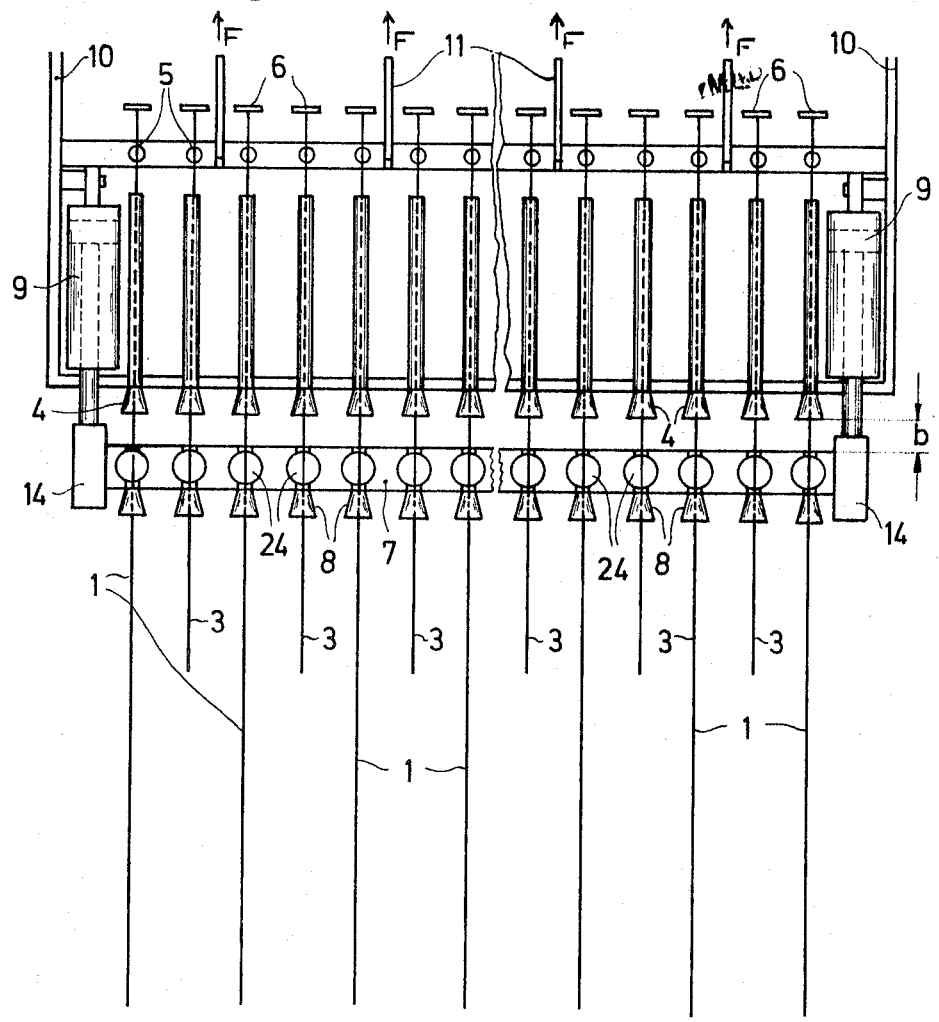

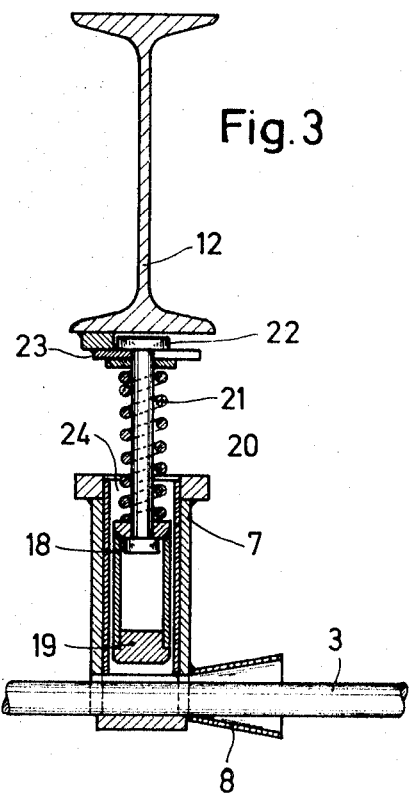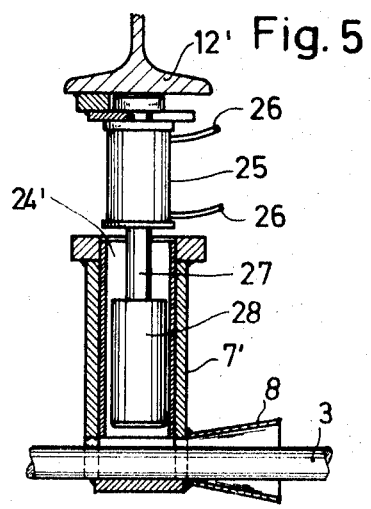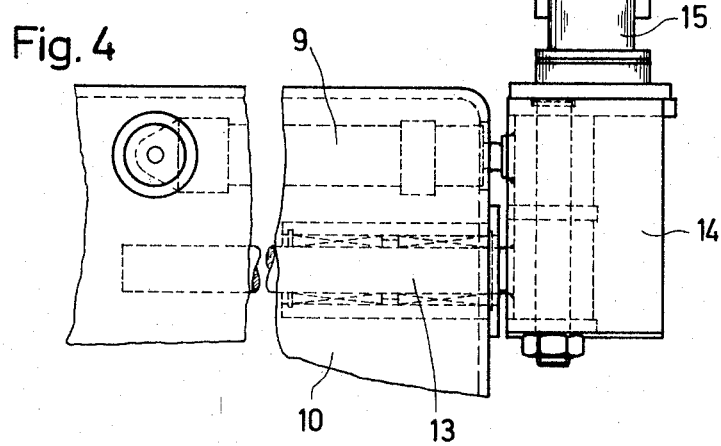

REINFORCING STEEL MATS

The present invention relates to reinforcing steel mats for use in concrete slabs, floors, etc., more particularly mats of the type composed of a first set of spaced and parallel longitudinal bars intersected by a second set of spaced and parallel crossbars, both said sets firmly secured by spot-welding at their intersection points.

In the fabrication of reinforcing steel mats of the foregoing type, it is customary to weld a crossbar at a time to the prealigned longitudinal bars by means of an array of multiple spot-welding electrodes, to then advance the partly completed mat structures, by means of intermittent feeding means operative upon said crossbar in the position of and upon welding, by a distance equal to the crossbar spacing distance, and to continue the operation by the application and welding of additional crossbars and intermittent feeding of the partially completed mat structures, until all the crossbars have been welded to the longitudinal bars.

The present invention is more specifically concerned with a method of and apparatus for the fabrication of reinforcing steel mats of the referred to type, wherein the number of longitudinal bars varies for different longitudinal sections of the mats, in an effort to adapt the latter to varying loads or stress distribution in the final concrete structures in which the mats are to be used. In order to achieve this object according to conventional practice, auxiliary longitudinal bars of smaller length than the main longitudinal bars are introduced during the welding operation at the appropriate places of the mats or, alternatively, part of the longitudinal bars of equal length are displaced in the longitudinal direction relative to the remaining bars.

In the design of reinforced concrete structures, it has become customary to utilize reinforcing mats adapted, as to their relative steel cross section per unit length, to the load distribution, in particular the bending stresses to which the structures are subjected in use. In mats of this type, not all the longitudinal bars extend throughout the entire length of the mats in that either additional bars of smaller length are interposed between the main bars, or bars of lesser length than the length of the final mat structures are used with one part of the bars displaced longitudinally relative to the remaining bars, whereby to result, in either case, in a greater steel cross section in the center compared with the end zones of the mats. This design, while conforming with existing load distributions in numerous practical cases, has the advantage of a substantial reduction of the total steel consumption, compared with conventional mat structures having a constant metal cross section distribution throughout corresponding to the maximum local or partial stress to which the mats are subjected in use.

In the fabrication of concrete reinforcing steel mats including longitudinal bars of different length by means of multiple spot-welding devices, difficulties are experienced in that it becomes necessary, during the manufacture of each mat, comprised in the manner described of longitudinal and cross bars, to interrupt the welding process after completion of a number of initial cross bar welding operations for the introduction of the shorter bars between the longer bars within the central regions of the mats. This additional operation is normally carried out manually, resulting thereby in the necessity of stopping the machine and greatly reducing the economy and manufacturing efficiency of the welding process.

Besides, difficulties are experienced, especially in the case of mats of relatively large width, in that the entire space in front of the point of introduction of the bars is taken up by the already inserted bars, whereby to render it highly difficult to introduce the shorter bars into the corresponding guides provided therefor. Besides, it is difficult, if not impossible, to provide an abutment for the alignment of the shorter bars because all the available space is practically taken up both by the previously welded parts of the mats and by lower electrodes of the welding device.

Accordingly, an important object of the present invention is the provision of an improved method of and apparatus for the fabrication of concrete reinforcing steel mats including longitudinal bars of varying length, or mats wherein the number of longitudinal bars varies for different longitudinal sections of the mats, whereby the foregoing and related difficulties and drawbacks are substantially overcome.

A more specific object of the invention is the provision of an improved method and apparatus of this type by which the change of the number of longitudinal bars within different sections of the mat is effected substantially without interrupting the continuous welding process or operation of the machine.

Yet another object of the invention is the provision of a multiple spot-welding machine of the referred to type including work feeding means for the fabrication of reinforced concrete steel mats, wherein the number of longitudinal bars differ for different longitudinal sections of the mats, said machine being designed to enable a continuous welding of a complete mat structure, without interruption so as to render it suitable for automatic control or programmed production of the mats.

The invention, both as to the foregoing and ancillary objects as well as novel aspects thereof, will be better understood from the following detailed description of a preferred practical embodiment, taken in conjunction with the accompanying drawings forming part of this specification and in which;

FIG. 1a is a schematic representation of a multiple spot-welding machine constructed in accordance with the principles of the invention for the fabrication of reinforced concrete steel mats including longitudinal bars of different length, the machine being shown in its starting position, or position after introduction of both the longer and shorter longitudinal bars to be connected by crossbars during a continuous operating cycle of the machine;

FIG. 1b, being similar to FIG. 1a, shows the machine in the position for the welding of the main or longer bars, with the shorter bars in the retracted or nonoperative position;

FIG. 3 is a sectional view, taken on line III-III of FIG. 2 and more clearly showing the construction of a clamping device for the shorter bars;

FIG. 4 is a side elevational fragmentary view as seen in the direction of the arrow A of FIG. 2; and FIG. 5, being similar to FIG. 3, shows a modification of the clamping device.

Like reference characters denote like parts and elements throughout the different views of the drawings.

Figure 1B:
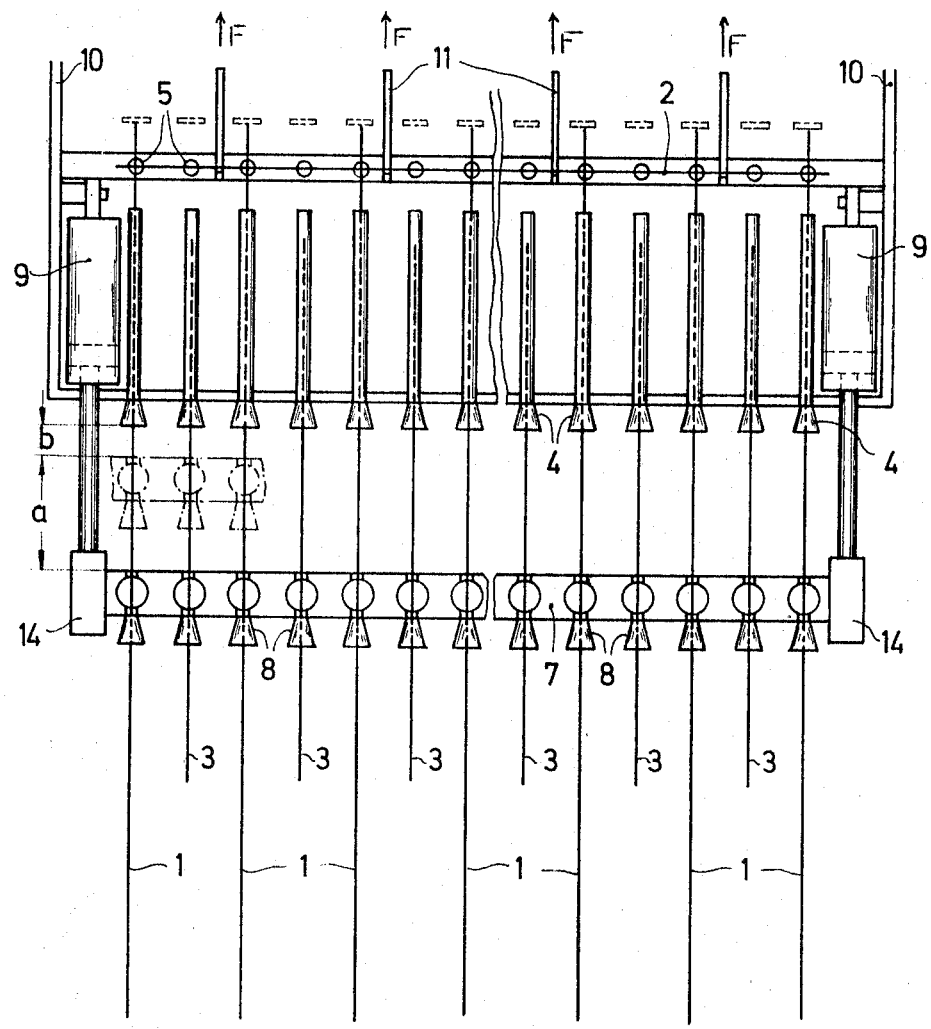
FIG. 1c is a schematic view showing, by way of example, a final mat structure obtained by means of a machine according to FIGS. 1a and 1b.

With the foregoing objects in view, the invention, according to one of its aspects, involves generally the steps of first introducing the aligned both longer and shorter longitudinal bars into the welding machine with the leading ends of both types of bars coinciding, by engaging suitable abutment means, with a line parallel to the axis of the multiple welding electrodes spaced at distances equal to the spacing distance between said bars, subsequently seizing the shorter bars and retracting the same in unison from the operating or welding position. After welding of a predetermined number of crossbars to the longer longitudinal bars, the shorter bars are again returned, without interrupting the operation of the machine, to their operative position in relation to the welding electrodes, whereby to take part in the subsequent welding operations and to result in a final mat structure consisting of longer bars corresponding to the total length of the mat with shorter bars symmetrically interspersed between said longer bars.

By the use of an operation as described in the foregoing, it is not only possible to introduce the shorter bars, taking a delayed part in the welding process, simultaneously with the longer bars, but furthermore to initiate the operation of returning the shorter bars, after a predetermined number of preceding crossbar welding operations, by the use of automatic control means synchronized with the normal operating rhythm of the machine.

The means for carrying into effect the invention advantageously utilizes a clamping beam disposed parallel to the welding beam supporting the array of spot welding electrodes, said clamping beam being retractable within a horizontal plane in respect to said welding beam as viewed in the feeding direction, and supporting a plurality of discrete removable and spaced clamping devices for the selective securing thereto of any of the aligned shorter longitudinal bars passing through horizontal apertures of said beam.

The clamping devices may consist each of a spring-urged clamping head and may be operated in unison by mechanical, pneumatic or hydraulic actuating means. Alternatively, each clamping device may include its own pneumatic or hydraulic actuating unit controlled by a common source of pressurized fluid.

The means for the retraction of the shorter bars from operative or welding position may be incorporated without difficulty in conventional welding devices, to enable a withdrawal from operative position of the shorter longitudinal bars prior to the commencement of the first crossbar welding operation. A counter, either mechanical or electrical, being synchronized with the operating rhythm of the welding machine may serve to initiate the return of the clamping beam to the operative position, after termination of a predetermined number of initial crossbar welding operations, to cause the shorter bars to be inclined in the welding of the subsequent crossbars, in such a manner as to enable a continuous or uninterrupted operating process throughout the entire operating cycle in fabricating a complete mat structure, in a manner as will become further apparent from the following description in reference to the drawings.

Referring more particularly to FIG. 1a, the longer longitudinal bars 1 alternating with shorter longitudinal bars 3, to be joined by crossbars 2, FIG. 1b, are aligned with constant spacing distances between adjacent bars, relative to each other and an array of spot welding electrodes 5, by means of guides 4 in the form of tubes or the like. The bars, upon introduction into the welding machine, are initially positioned with their leading ends coinciding with a line parallel to the axis of and behind the electrodes 5, as viewed in the feeding direction of the bars, or partial mat structures, indicated by the arrows F in the drawing. In order to facilitate the alignment or positioning of the bars, there is further provided an array of abutments 6, in the example illustrated. The introduction of the bars 1 and 3 is carried out in the normal position of a clamping bar 7 disposed parallel to the welding bar supporting the electrodes 5, as indicated by the distance b between the bar 7 and the ingress openings of the guide tubes 4. The bars 1 and 3 pass through longitudinal guide holes or bores in the beam 7, their introduction therein being facilitated by the provision of entrance cones 8.

After both the bars 1 and 3 have been introduced into the machine and positioned in the manner described and shown in FIG. 1a, the shorter bars 3 are clamped by or secured to the beam 7, in the manner described in greater detail hereafter, and subsequently retracted from the normal or operative position shown in FIG. 1a to an inoperative position shown in FIG. 1b by means of suitable actuating means for the beam 7, such as a pair of stationary pressure cylinders 9 rotatively mounted upon the frame 10 of the machine and including movable pistons which are in turn operably connected to supports or brackets 10 at both ends of beam 7. In other words, the pneumatic or hydraulic actuators 9 enable the beam 7 and with it the short bars 3 clamped thereby to be operated between the FIG. 1a and FIG. 1b positions, or positions of distance b and a, respectively, of the beam 7 from the ingress ends of the guide tubes 4. Any other actuating means for the operation of the beam 7 in the manner described may be utilized for the purpose of the invention, as will be understood.

Figure 1C:
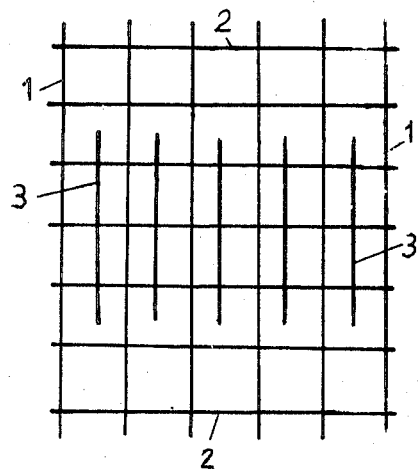

After the short bars 3 have been retracted, in the direction opposite to the feeding direction F, to the inoperative position according to FIG. 1b, welding of the crossbars 2 to the longer longitudinal bars 1 is carried out in the ordinary manner by applying a crossbar 2 from above by suitable feeding means (not shown) to the electrodes 5, welding the crossbar to the longitudinal bars 1 by the multiple spot-welding apparatus, whereupon the welded crossbar is seized in known manner by the hooks 11 of an intermittent feeding device synchronized with the operating rhythm of the machine, to advance the partially welded mat structure, that is, minus the shorter longitudinal bars 3, by a crossbar spacing distance in the feed direction F, to a position for the welding of the next crossbar in the same manner as described, and so on and so forth. After the welding of a predetermined number of crossbar 2 to the bars 1, as advantageously determined by a mechanical or electrical counter, the shorter bars 3 clamped by the beam 7 are returned, in synchronism with the normal operating rhythm or feeding cycles of the machine, to their operative position of FIG. 1a by the actuators 9, whereby the short bars 3 now take part in the subsequent crossbar welding operations. With the bars 1 and 3 having a proper relative length and with the number of crossbar welding operations involving both types of bars being properly determined or controlled, there is obtained in this manner a final mat structure as shown in FIG. 1c in which the shorter bars 3 are symmetrically located within the longer bars 1 of the complete mat structure, that is, with the reinforcing effect being greater in the center compared with the end zones of the mat.

Figure 2:
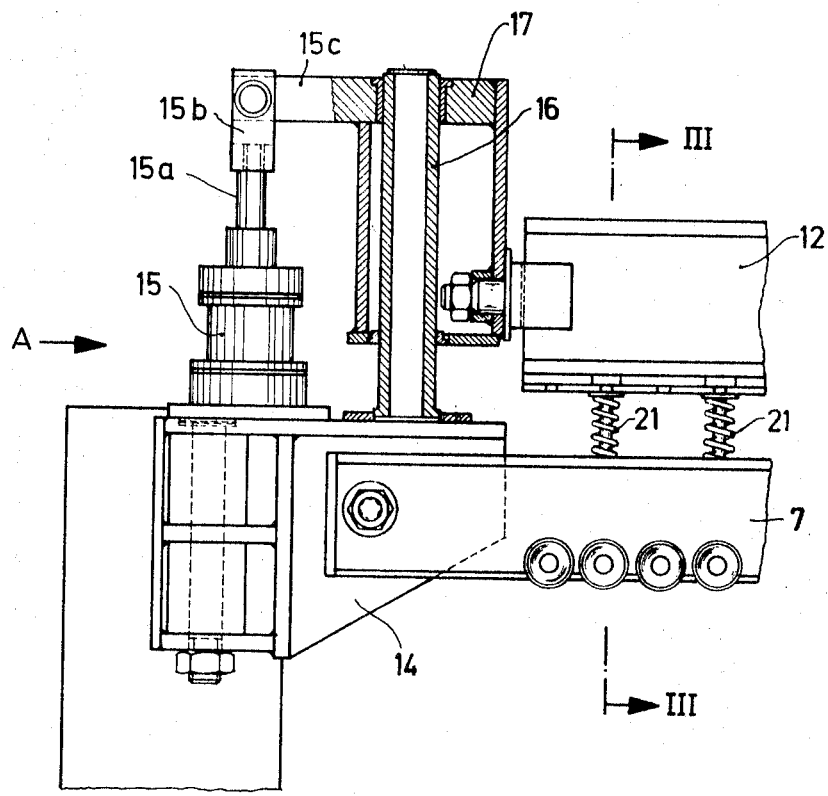
FIG. 2 is a fragmentary front elevational view of a practical construction of a machine according to FIGS. 1a and 1b, being shown partly in section and more clearly illustrating the clamping and pressure beams and associated operating means, for temporarily withdrawing the shorter bars from the welding operation.

FIGS. 2—4 illustrate in greater detail and by way of example a preferred practical embodiment of the welding apparatus schematically shown by FIGS. 1a and 1b and including means for temporarily clamping the rods 3. Principally, the clamping mechanism shown comprises the clamping beam 7 and a cooperating pressure beam or control member 12. The latter is relatively movably mounted upon the beam 7 whose operation in the horizontal direction is effected by the actuators 9 in the manner described hereinbefore and further shown in FIG. 4. In order to relieve the cylinders 9, the supports or brackets 14 are fitted with guide rods or dowels 13, FIG. 4, slidably within suitable guides or bores of the frame 10, in a manner readily understood.

Operation of the pressure beam 12 is effected, in the example shown, by means of a pair of further pneumatic or hydraulic actuators 15 mounted upon the tops of the supports 14. As more clearly shown in FIG. 2, the upper end of the pistons 15a of a cylinder 15 is connected, via a fork 15b and lever 15c, with a parallel guide unit, two such units being provided at the opposite end of the beam 7 and each consisting of a guide column 16 mounted upon the support 14 and a guiding member 17 slidable upon said column and connected to one end of the pressure beam 12. The latter is connected with the beam 7 through a plurality of discrete clamping devices more clearly described in the following.

FIG. 3 shows a section through the clamping beam 7, pressure beam 12 and an intervening clamping device, the number and spacing of the devices corresponding to the number of the bars 3 to be clamped, as is understood. Actuating pressure is applied via the beam 12 such that clamping is effected of the rods 3 only which are to be retracted, while the rods 1 are allowed to pass freely through the apertures of the beam. For this purpose, discrete and removable clamping units or devices are provided according to the invention which can be readily removed and applied, to suit any existing conditions and requirements.

For the latter purpose, the clamping devices as shown in FIG. 3 consist of a sleeve 18 supporting a clamping head 19, a guide stem 20 and a compression spring 21 surrounding the latter. The outer end of the stem 20 carries a cap 22 enabling an easy and removable mounting upon the underface of the beam 12 by the provision of a comb-shaped plate 23 providing a bayonetlike mount for the firm securing therein of the cap 22. The clamping devices are guided in the vertical direction within vertical bores 24 in the beam 7 corresponding to and arranged at a spacing equal to that of the welding electrodes 5.

In operation, actuation of the pressure beam in the downward direction by the application of pressurized fluid to the cylinders 15, provided at both ends of the beam 7, results in the compression of the springs 21 which, in turn, cause a clamping of the respective longitudinal bars 3 via the pressure beads 19 and sleeves 18. Not withstanding the simultaneous actuation of all the clamping devices by the beam 12, an individual clamping action results by the springs 21 of each device building up its own pressure independently of the remaining devices. In other words, in the embodiment of the clamping devices as shown by FIGS. 2—4, the arrangement is such that, while the pressure for the operation of all the devices is produced by the cylinders 15, its effect on the rods 3 to be clamped is indirect via the spring 12.

In place of the unicontrol of all the clamping devices by means of a single pressure-applying member or beam as shown in FIG. 3, the clamping beam 7', FIG. 5, may be fitted with individual pneumatic or hydraulic, etc., actuators 25 which may be operated, via fluid pressure supply lines 26, uniformly and independently of each other by a common source of pressurized operating fluid. In the latter case, the piston rod 27 directly carries the pressure head 28 movable within the vertical bores 24' of the beam 7' which latter in this case is fast on or rigidly connected to said beam.

In the foregoing, the invention has been described in reference to a specific illustrative and exemplary device. It will be evident, however, that variations and modifications, as well as the substitution of equivalent parts or devices for those shown herein for illustration, may be made without departing from the broader spirit and perview of the invention, as set forth in the appended claims. The specification and drawings are accordingly to be regarded in an illustrative rather than in a restrictive sense.

I claim:

1. In welding apparatus for the fabrication of concrete reinforcing steel mats composed of spaced parallel longitudinal bars intersected by spaced parallel crossbars, said apparatus being of the type comprising an array of spot-welding electrodes spaced by distances equal to the spacing distance of and aligned with said longitudinal bars, for simultaneously spot welding a single crossbar to the aligned longitudinal bars, and intermittent feeding means operative on a crossbar in the position of and upon welding to said longitudinal bars, to advance the partially welded mat structure by a distance equal to the crossbar spacing distance, for the successive welding of a number of crossbars to the prealigned longitudinal bars, the improvement consisting in the provision of
   1. a clamping beam disposed ahead of and parallel to the axis of said welding electrodes, as viewed in the feeding direction, said beam including longitudinal apertures for the passing of the longitudinal bars in aligned position on their way to said welding electrodes,
   2. abutment means disposed behind said welding electrodes, as viewed in the feeding direction, to initially align the leading ends of all longitudinal bars to coincide with a line parallel to the axis of said electrodes,
   3. multiple spaced and releasable clamping means mounted upon said beam, to temporarily secure thereto predetermined ones of the longitudinal bars, and
   4. means to operate said beam, respectively, between an operative position and a retracted inoperative position, in respect to said electrodes, for temporarily withdrawing the clamped longitudinal bars from the crossbar welding operations.

2. In welding apparatus as claimed in claim 1, said beam including a plurality of vertical bores each communicating with one of said longitudinal apertures, and said clamping means being comprised of a plurality of discrete clamping devices removably mounted each in a vertical bore of said beam, to releasably lock selected ones of the longitudinal bars to the associated longitudinal bores of said beam.

3. In welding apparatus as claimed in claim 1, said beam including a plurality of vertical bores each communicating with one of said horizontal apertures, and said clamping means being comprised of a common operating member movable relatively to said beam, and a plurality of discrete clamping devices removably mountable upon said member and each extending through one of said longitudinal bars, to simultaneously secure selected ones of said longitudinal bars to said beam by operation of said member.

4. In welding apparatus as claimed in claim 1, said beam including a plurality of vertical bores each communicating with one of said horizontal apertures, and said clamping means being comprised of a pressure beam arranged parallel to and operable between two positions close to and remote from, respectively, said clamping beam, and a plurality of spring-urged clamping heads removably mountable upon said pressure beam and extending each through one of said vertical bores into clamping engagement with and disengagement from the respective longitudinal bars in accordance with the position of said pressure beam.

5. In welding apparatus as claimed in claim 1, said beam including a plurality of vertical bores communicating with said horizontal apertures, and said clamping means being comprised of a plurality of spring-urged clamping heads each slidably mounted in one of said vertical bores and discrete pressurized fluid actuating devices for each of said heads supported by said beam.

6. In welding apparatus for the fabrication of concrete reinforcing steel mats composed of spaced parallel crossbars, said apparatus being of the type comprising an array of spot-welding electrodes spaced by distances equal to the spacing distance of an aligned with said longitudinal bars, for spot welding a single crossbar at a time to the aligned longitudinal bars, and intermittent feeding means operative on a crossbar in the position of and upon welding to said longitudinal bars, to successively advance the partially welded mat structure by a distance equal to the crossbar spacing distance, for the welding of a number of crossbars to the prealigned longitudinal bars, the improvement consisting in the provision of
   1. means disposed behind said welding electrodes, as viewed in the feeding direction, to initially align the leading ends of all said longitudinal bars to coincide with a line parallel to the axis of said electrodes,
   2. a control member carrying multiple clamping means, to secure thereto selected ones of said longitudinal bars in the initially aligned position, and
   3. means to temporarily retract said member to an inoperative position, to withdraw the clamped longitudinal bars from the crossbar welding operations by said electrodes.

7. In the art of fabricating concrete reinforcing mats composed of spaced and parallel longitudinal bars intersected by spaced and parallel crossbars by successively applying and welding, by means of an array of multiple spot-welding electrodes, a crossbar at a time to the aligned longitudinal bars and successively advancing the partially welded mat structures, by feeding means operative upon the crossbars in the position of and upon welding, past the welding electrodes by distances equal to the crossbar spacing distance, the improvement consisting in the steps of
   1. arranging all the longitudinal bars at an initial position with their leading edges coinciding with a line ahead of, as viewed in the feeding direction, and parallel to the axis of said welding electrodes,
   2. clamping and retracting predetermined ones of said longitudinal bars from said initial position to a position with their aligned edges behind said axis and out of operating range with the respective welding electrodes,
   3. successively welding a predetermined number of crossbars to the nonretracted longitudinal bars,
   4. returning the retracted crossbars to their initial position, and
   5. continuing the welding of crossbars to all the aligned longitudinal bars of said mat.

UNITED STATES PATENT OFFICE
CERTIFICATE OF CORRECTION

Patent No. 3,597,568      Dated August 3, 1971

Inventor(s) Hans Rach

It is certified that error appears in the above-identified patent and that said Letters Patent are hereby corrected as shown below:

Title page, left column, line 8 of the heading, after "Priority", "Mar. 27, 1967" should be --- Mar. 23, 1967 ---.

Signed and sealed this 14th day of March 1972.

(SEAL)
Attest:

EDWARD M. FLETCHER, JR.
Attesting Officer

ROBERT GOTTSCHALK
Commissioner of Patents